Feb. 15, 1966  J. R. IRELAND  3,235,776
PERMANENT MAGNET STABILIZER SYSTEM AND METHOD
Filed July 31, 1961
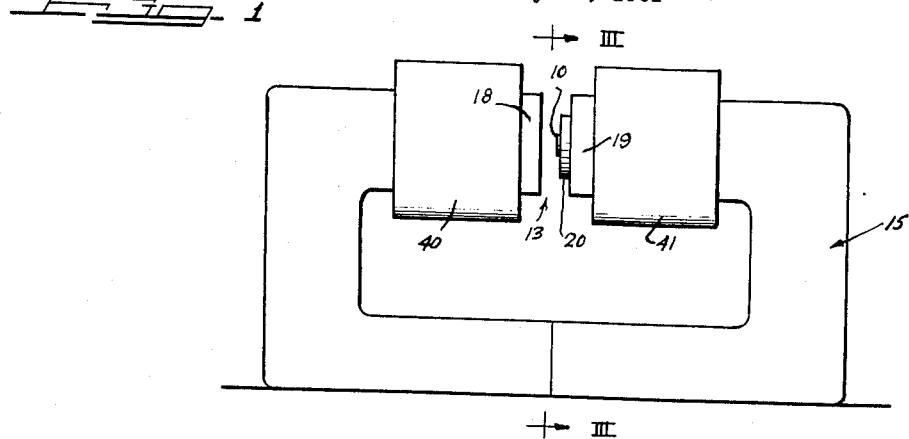
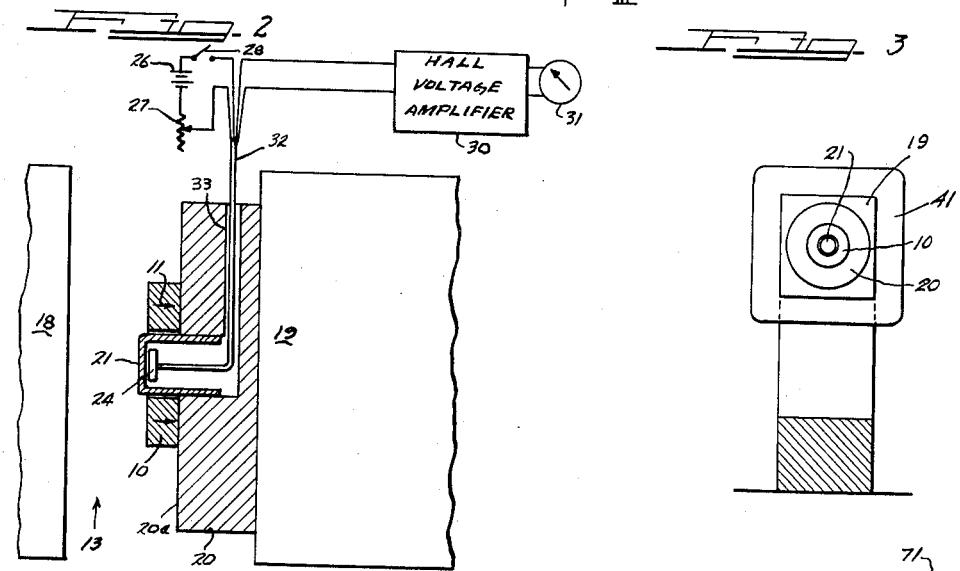
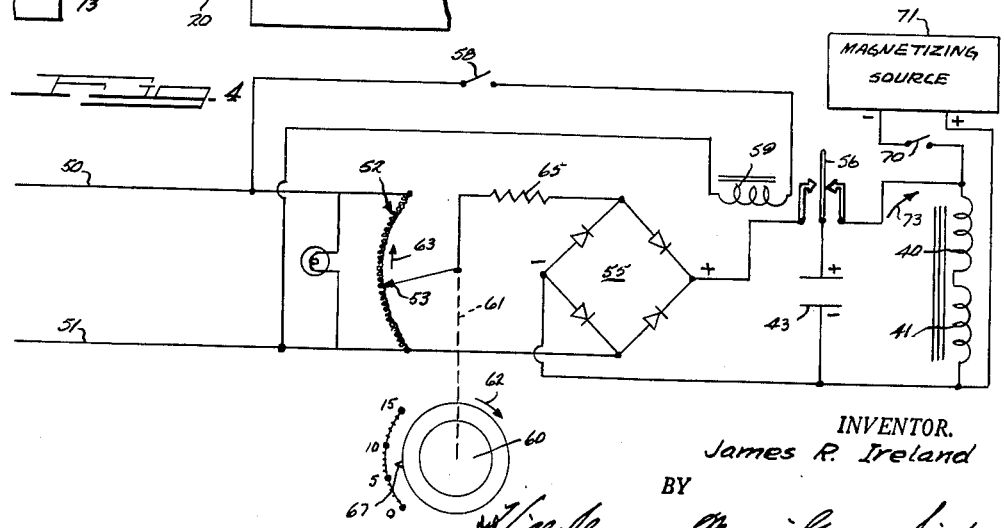
INVENTOR.
James R. Ireland
BY
ATTORNEYS

United States Patent Office 3,235,776
Patented Feb. 15, 1966

3,235,776
PERMANENT MAGNET STABILIZER
SYSTEM AND METHOD
James R. Ireland, Valparaiso, Ind., assignor to Indiana General Corporation, Valparaiso, Ind., a corporation of Indiana
Filed July 31, 1961, Ser. No. 127,961
5 Claims. (Cl. 317—157.5)

This invention relates to a method and means for adjusting the field strength of a permanent magnet from an initial relatively higher value to a predetermined relatively lower stabilized value and particularly to apparatus for rapidly and efficiently reducing the field strength of a succession of permanent magnets from an initial range of values to substantially a predetermined stabilized value.

In certain types of equipment utilizing permanent magnets, the field strength of the magnet must lie within a narrow range of values for efficient operation of the equipment. For example, the field strengths of permanent magnets used in the focus units of travelling wave tubes require very critical adjustment. There is thus a need for an apparatus which is capable of rapidly and efficiently adjusting the strength of permanent magnets as a part of the production process for various types of equipment.

I have heretofore proposed that a sensing coil of a flux meter be associated with a permanent magnet field strength adjustment fixture to provide an indication of the magnet strength during the adjustment procedure. This system involves the continuous excitation of the magnet with an alternating current stabilizing field during the adjustment process and requires the use of a compensating coil for cancelling the effect of the stabilizing field to provide a reading of the field strength of the permanent magnet.

By the present invention it is proposed to utilize a semiconductor body such as a Hall element for measuring the field strength of the permanent magnet during the adjustment process and successively reducing the field strength of the permanent magnet by applying successively greater quantities of charge to a capacitor which is then connected in an oscillatory electric circuit with a winding associated with the magnet position. As the capacitor is discharged, the field produced by the winding automatically and rapidly reduces to zero whereupon the Hall element will provide a measure of the field strength of the magnet in the absence of any disturbing field. The charge supplied to the capacitance means can very conveniently be increased in sufficiently small increments to insure a precise adjustment of the field strength of the magnet within the required tolerance range and there is no necessity for the use of a compensating coil or other means for eliminating the effect of the stabilizing field during measurement steps. Equipment in accordance with this conception has been utilized on sample production of travelling wave tube focus units with excellent results.

It is therefore an object of the present invention to provide an apparatus for adjusting the strength of permanent magnets which is uniquely simple and efficient and is capable of adjusting the field strength of permanent magnets to a desired value with a high degree of accuracy.

It is a further object of the present invention to provide a highly reliable system and method for stabilizing permanent magnets at a precise value of field strength on a rapid and efficient production basis.

Still another object of the present invention is to provide an apparatus for successively reducing the field strength of a permanent magnet toward a desired value without danger of inadvertently reducing the field strength to a value below the tolerance range of values.

Other objects, features and advantages of the invention will be apparent from the following detailed description taken in connection with the accompanying drawings, in which:

FIGURE 1 is a somewhat diagrammatic side elevational view illustrating apparatus for adjusting the field strength of permanent magnets in accordance with the present invention;

FIGURE 2 is a fragmentary enlarged view of the apparatus of FIGURE 1 with certain parts in section and illustrating the electrical connections to the Hall probe;

FIGURE 3 is a somewhat diagrammatic vertical sectional view taken generally along the line III—III of FIGURE 1; and FIGURE 4 illustrates an electric circuit for use with the apparatus of FIGURES 1-3.

The present invention is illustrated by way of example for the case where permanent magnets of ring configuration and magnetized in an axial direction are to be stabilized at a predetermined strength. For example, the illustrated apparatus is adapted to the adjustment of the field strength of permanent magnets to be used in the focus units of travelling wave tubes. It will be understood that the present invention is broadly applicable to many different permanent magnet configurations with corresponding suitable changes in the fixture for mounting the permanent magnet and sensing the magnetic field output therefrom.

Referring to FIGURES 1 and 2, the reference numeral 10 designates a permanent magnet whose level of magnetization is to be adjusted to a predetermined value. The magnet 10 has a direction of magnetization as indicated by the arrow 11 and, for example, may be brought to a saturation level of magnetization by any suitable apparatus prior to the field adjustment step of the present invention.

The magnetized permanent magnet 10 is illustrated as being mounted in a gap 13 of a magnetic core 15 midway between the pole pieces 18 and 19 of the core. The means for positioning the magnet may comprise a locator plate 20 of non-magnetic material carrying a probe element 21 which is adapted to receive the magnet 10 in close fitting relationship to support the magnet in a fixed magnet position in the gap 13. The locator plate 20 may be fixed in the position shown in FIGURE 2 by any suitable means and may have a flat face 20a for abutting relation to a side face of the magnet 10. Within the probe element 21 is a semi-conductor body 24, such as a Hall element arranged so that its magnetic field sensitive axis coincides with the axis of the magnet 10. A suitable source of electric current for the Hall element 24 is diagrammatically indicated as comprising a battery 26 and variable resistance 27 which are connected with the current terminals of the Hall element under the control of a switch 28. The output terminals of the Hall element 24 may be connected to the input of a suitable Hall voltage amplifier diagrammatically indicated at 30 which has its output connected to a suitable indicating instrument diagrammatically indicated at 31. The electrical connections to the Hall element 24 are indicated as being made by means of an electric cable 32 extending through a passage 33 in the locator plate 20. The Hall element 24 is, of course, rigidly fixed in a predetermined position within the probe 21 by any suitable means.

In the illustrated embodiment, the air gap 13 is sufficiently long in the axial direction so that the magnet 10 may be removed from the probe element 21 in the axial direction to the left as seen in FIGURE 2 and removed from the locator assembly.

The locator assembly including locator plate 20 and probe element 21 are thus adapted to receive a series of annular permanent magnets and to position each magnet in succession in a fixed magnet position which is precisely determined relative to the semi-conductor body 24 which serves as the magnetic field sensing element. By way of example a group of magnets to be stabilized at a desired value may be initially saturated and may have a relatively wide range of magnetic field output values at the Hall element 24 under saturated conditions. The initial range of magnetic field strength for a substantial number of magnets will normally greatly exceed the tolerance range permitted at the desired nominal field strength at which the magnets are to be stabilized. By way of example, the desired nominal stabilized value of magnetic field strength may lie approximately 10% below the average saturation field strength of the group of magnets. The apparatus illustrated by way of example has been utilized to bring the magnet strength of such a group of magnets to within a fraction of a percent of a desired value very quickly.

In the drawings, the source of stabilizing field for adjusting the strength of the successive permanent magnets is illustrated as comprising a pair of windings 40 and 41 which are positioned on the pole pieces 18 and 19 relatively closely adjacent the gap 13. By way of example the windings have been indicated as connected in series in FIGURE 4 although the windings could also be designed so as to be connected in parallel. A capacitance means 43 is provided which is adapted to form an oscillatory electric circuit with the windings 40 and 41 in series. Means is provided for charging the capacitance 43 to an adjustable value and such means comprises alternating current supply lines 50 and 51 connected to the terminals of a variable voltage transformer 52 having a sliding contact diagrammatically indicated at 53 which preferably is adapted to make electrical contact with the successive individual turns of the transformer winding. The transformer 52 thus provides sensitive control of the voltage supplied to full wave rectifier 55 to control the quantity of charge transferred to the capacitance means 43 when contact 56 is in its left hand position. A switch 58 is illustrated controlling energization of an A.C. relay coil 59 for shifting contact 56 to the left when energized. Any suitable means returns the contact 56 to the position shown in FIGURE 4 when switch 58 is opened. By way of example, a rotary manual control knob is indicated at 60 which is mechanically coupled to the sliding contact 53 as indicated by dash line 61. Thus, as knob 60 is manually rotated in the direction of arrow 62 contact 53 moves in the direction of arrow 63 to supply a progressively increasing alternating current voltage to the rectifier 55 through resistance means indicated at 65. The knob 60 may have a pointer 67 movable therewith and cooperating with suitable indicia such as the equally spaced points numbered 0 through 15 in FIGURE 4.

Summary of operation

In operation of the illustrated apparatus, a permanent magnet 10 is slipped over the probe element 21 and pressed against the locating surface 20a of locator plate 20 so as to position the magnet in a fixed magnet position midway between the magnetic poles 18 and 19 as shown in FIGURE 2. The magnet may have been magnetized as indicated by the arrow 11 in FIGURE 2 in a separate magnetizing fixture, or magnetization may be carried out by the apparatus illustrated in the drawings by closing switch 70, FIGURE 4, to supply a suitable magnetizing current to windings 40 and 41 from a magnetizing source indicated at 71. By way of example, the magnet may be magnetized in the axial direction as indicated by arrow 11 to a saturation value or to a lesser value which is still substantially above the final required level of magnetization of the magnet to be produced.

During the magnetizing operation when switch 70 is closed, switch 58 will normally be closed so that the capacitor 43 will receive a desired initial level of charge. The switch 70 controlling application of the magnetizing current will then be opened before switch 58 is opened to supply stabilizing current to the windings 40 and 41.

With the magnet on the locator probe part 21 in the fixed magnet position assuming the magnet to have been previously magnetized, switch 28 may be closed to supply a constant current to the Hall element 24 whereupon indicator 31 will register the initial level of magnetization of the permanent magnet. With switch 58 open, the operator will then manually set the control knob 60 to an initial position which is found suitable on the basis of previous experience. For example, the knob may be set at position number 7 as indicated in FIGURE 4. Switch 58 is now closed to shift contact 56 to the left and supply a corresponding charge to capacitor 43. Upon opening of switch 58, capacitor 43 discharges to produce an oscillatory electric current in the windings 40 and 41 which has an initial polarity as indicated by arrow 73 in FIGURE 4 and has an initial amplitude in accordance with the setting of knob 60. The current has an oscillatory waveform of alternating polarity and decaying amplitude. The amplitude of the current may decay substantially to zero in a period of less than one second. The corresponding decaying oscillatory magnetic field produced by windings 40 and 41 and impinging on the permanent magnet 10 reduces the level of magnetization of the permanent magnet and tends to stabilize the magnet at the new value. As soon as the magnetic field from windings 40 and 41 has decayed to zero, the Hall magnetic field sensing system including Hall element 24 will provide an accurate indication of the new magnetic field strength of the permanent magnet. Based on this new value, the operator rotates the knob 60 in the direction of arrow 62 to a new setting which is designed to bring the level of magnetization of the permanent magnet substantially to the desired value. Switch 58 is now again closed to charge the capacitor 43 to a new somewhat higher voltage and switch 58 again opened to produce a further oscillatory magnetic field having a somewhat higher initial amplitude than the previously applied field. By this means, the level of magnetization of the magnet 10 is further reduced and is stabilized at a new value closer to the desired value to be achieved.

Should the level of magnetization still be slightly above the permissible tolerance range of values which may, for example, be within plus or minus ½% of a nominal value, the knob 60 is again rotated in the direction of arrow 62 to supply a somewhat higher charge to capacitance 43. Conveniently, the successive indicia numbered 0–15 associated with point 67 may have a spacing corresponding to an angular adjustment of contact 53 which is less than that required to reduce the magnetization of the permanent magnet by an amount equal to the tolerance range. In this manner, no matter how close the magnet field strength may be to the tolerance range, the operator can be confident of not reducing the magnetization below the tolerance range by limiting the adjustment of the knob 60 to a single increment of adjustment. Thus, if in the second step of the process, the operator has shifted pointer 67 to the number 10, and it is found that the magnet has a level of magnetization ½% above the upper permissible value of magnetization, and if the successive increments numbered 0–15 in FIGURE 4 will not produce a change of magnetization greater than 1% for values of magnetization near the desired value, by setting the pointer 67 to number 11, the operator can be confident that the magnet will not be reduced to a level of magnetization below the tolerance range.

It has been found that by utilizing an electric circuit as illustrated in FIGURE 4 in conjunction with a Hall body located as indicated in FIGURE 2, only two or three charging and discharging steps are required to bring the magnet strength to within a fraction of a percent of the desired value.

It will be apparent that many modifications and variations may be effected without departing from the scope of the novel concepts of the present invention.

I claim as my invention:

1. Apparatus for adjusting the field strength of each of a succession of permanent magnets from a range of initial values to a predetermined stabilized value lying within a predetermined tolerance range comprising a magnetic core having a pair of spaced confronting polar faces separated by a non-magnetic gap, means for supporting each of said permanent magnets in succession at a fixed magnet position centrally within said non-magnetic gap and in spaced relation to said polar faces with non-magnetic material only separating said magnet position from said polar faces, winding means on said core for producing a magnetic field in said non-magnetic gap intersecting said magnet position, capacitance means for forming an oscillatory electric circuit with said winding means, capacitance charging means for supplying a charging current to said capacitance means, contact means for alternately connecting said capacitance means either with said charging means and with said winding means and providing for an alternating polarity discharge current through said winding means of successively opposite polarity and decaying amplitude when said capacitance means is connected with said winding means, magnetic field measuring means for measuring the magnetic field strength of said permanent magnet in said magnet position comprising a semi-conductor body, means mounting said semi-conductor body at a fixed position closely adjacent said magnet position and within the field of the magnet at said magnet position and rigidly connecting said semi-conductor body with said magnetic core, said capacitance charging means having incremental adjustment means adjustable in incremental steps for increasing the charge supplied to said capacitance means, and manually operable means coupled to said incremental adjustment means for adjusting said incremental adjustment means and having means defining incremental steps in the adjustment of said incremental adjustment means corresponding to increments of charge supplied to said capacitance means less than that required to reduce the magnetization of said permanent magnet from the maximum to the minimum value in said predetermined tolerance range.

2. Apparatus for adjusting the field strength of a permanent magnet to a value within a predetermined tolerance range comprising a magnetic core having a magnetic field region for receiving a permanent magnet and having winding means for exerting a magnetomotive force on said core to produce a magnetic field in said magnetic field region, means for supporting said permanent magnet at a predetermined fixed magnet position in said magnetic field region, capacitance means for forming an oscillatory electric circuit with said winding means, means including one position of a contact member for connecting said capacitance means with said winding means to form an oscillatory electric circuit and providing for an alternating polarity discharge current through said winding means having at least one reversal of polarity with decaying amplitude when said capacitance means is connected with said winding means, a capacitance charging means for supplying a charging current to said capacitance means, means including another position of said contact member for connecting said charging means to said capacitance means during successive capacitance charging operations, and magnetic field measuring means comprising a Hall element adjacent said magnet position for measuring the magnetic field strength of the permanent magnet at said magnet position, means rigidly connecting said Hall element to said magnetic core, said capacitance charging means having adjustment means adjustable to supply progressively greater quantities of charge to said capacitance means and having means defining adjustment steps of said adjustment means corresponding to increments of charge supplied to said capacitance means less than that required to reduce the magnetization of said permanent magnet from the maximum to the minimum value in said predetermined tolerance range to facilitate increasing the charge on said capacitance means in a capacitance charging operation by an increment less than that corresponding to the extent of said predetermined tolerance range.

3. Apparatus for adjusting the field strength of permanent magnets to a substantially desired stabilized value of substantial magnitude but less than an initial value which comprises means for mounting a permanent magnet in a fixed magnet position, electric winding means for producing a magnetic field at said magnet position, capacitance means for forming an oscillatory electric circuit with said electric winding means, means including a contact for connecting said capacitance means with said electric winding means to form an oscillatory electric circuit providing for an alternating polarity discharge current through said electric winding means of successively opposite polarity and decaying amplitude, capacitance charging means for supplying a charging current to said capacitance means, means including another position of said contact for connecting said charging means to said capacitance means during successive capacitance charging operations, and magnetic field measuring means entirely separate from the permanent magnets at said magnet position and comprising a Hall element adjacent said magnet position and rigidly secured to said permanent magnet mounting means to provide a precisely determined spacial relationship between said magnet position and said Hall element for reliable and consistent measurement of the magnetic field of successive magnets positioned at said magnet position, said capacitance charging means being operable to supply progressively greater quantities of charge to said capacitance means during successive capacitance charging operations to provide for alternating polarity discharge currents of successively greater initial amplitude through said winding means and to provide corresponding alternating polarity magnetic fields impinging on the magnet mounted at said magnet position for reducing the magnetic field strength of the magnet from an initial value to a value approaching a desired stabilized value of substantial magnitude but less than said initial value.

4. Apparatus for adjusting the field strength of permanent magnets to a predetermined stabilized value which comprises means directly engageable with a permanent magnet itself for mounting the permanent magnet in a fixed position with non-magnetic material only adjacent said permanent magnet, winding means for producing a magnetic field intersecting said magnet position, capacitance means for forming an oscillatory electric circuit with said winding means, adjustable charging means for selectively supplying a range of successively different quantities of electric charge to said capacitance means, switch means in one condition connecting said capacitance means with said adjustable charging means and disconnecting said capacitance means from said winding means and in a second condition connecting said capacitance means with said winding means and disconnecting said adjustable charging means from said capacitance means and in said second condition providing for an oscillatory discharge current of alternating polarity and decaying amplitude in said winding means, means for selectively actuating said switch means to assume said one condition for supplying charge to said capacitance means and for actuating said switch means to said second condition for producing an oscillatory electric current having at least one reversal of polarity with decaying amplitude in said winding means and a corresponding oscillatory magnetic field impinging on the magnet mounted at said magnet position for reducing the magnetic field strength of the magnet from an initial value to a desired stabilized value of susbtantial magnitude, magnetic field measuring means comprising a Hall element disposed in fixed relationship to said magnet position and within the magnetic field of the magnet at said magnet position and rigidly connected with said mounting means, and manually operable means coupled to said adjustable charging means for increasing the charge supplied to said capacitance means in successive cycles of actuation of said switch means until the magnetic field measuring means shows a magnetic field strength from the permanent magnet substantially equal to said desired stabilized value.

5. The method of adjusting the field strength of a magnetized permanent magnet which is thereafter to be placed in a utilization magnetic circuit to a predetermined stabilized value which comprises positioning the magnet itself without said utilization magnetic circuit in fixed relationship to a magnetic field with the field of the magnet intersecting the magnetic field, establishing an oscillatory magnetic field impinging on the magnet of progressively diminishing amplitude and having at least one reversal of polarity, sensing the magnetic field strength of the magnet after subjection to said oscillatory magnetic field, observing the sensed field strength, manually adjusting the amplitude of a successive oscillatory magnetic field based on the sensed field strength, and repeating the subjecting, sensing observing and adjusting steps with successively higher initial amplitudes of the oscillatory magnetic field until the magnet reaches said predetermined stabilized value.

References Cited by the Examiner

UNITED STATES PATENTS

| | | | |
|---|---|---|---|
| 2,046,111 | 6/1936 | Ely et al. | 317—157.5 X |
| 2,810,867 | 10/1957 | Gilbert | 317—157.5 |
| 2,898,408 | 8/1959 | Folse | 317—157.5 X |
| 3,093,774 | 6/1963 | Christianson et al. | 317—157.5 |

FOREIGN PATENTS

| | | |
|---|---|---|
| 882,033 | 2/1943 | France. |

SAMUEL BERNSTEIN, *Primary Examiner.*